(12) United States Patent
Gotoh

(10) Patent No.: US 11,036,047 B2
(45) Date of Patent: Jun. 15, 2021

(54) PROJECTION DEVICE, MOBILE OBJECT, AND METHOD OF SETTING PROJECTION DEVICE

(71) Applicant: Tokiko Gotoh, Kanagawa (JP)

(72) Inventor: Tokiko Gotoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 122 days.

(21) Appl. No.: 16/294,964

(22) Filed: Mar. 7, 2019

(65) Prior Publication Data

US 2019/0278084 A1    Sep. 12, 2019

(30) Foreign Application Priority Data

Mar. 12, 2018  (JP) .............................. JP2018-044792

(51) Int. Cl.
  *G02B 27/01*  (2006.01)
  *G02B 26/08*  (2006.01)
  (Continued)

(52) U.S. Cl.
  CPC ..... *G02B 27/0149* (2013.01); *G02B 26/0833* (2013.01); *G02B 26/105* (2013.01);
  (Continued)

(58) Field of Classification Search
  CPC ............ G02B 27/0149; G02B 26/0833; G02B 26/105; G02B 27/0101; G02B 2027/0123; G02B 2027/0154; G03B 21/20; G03B 21/145; G03B 21/10; G03B 21/005; G03B 21/22; G03B 21/28; B60K 2370/334; B60K 35/00
  See application file for complete search history.

(56) References Cited

U.S. PATENT DOCUMENTS 10,031,343 B2    7/2018  Saisho et al.
2004/0184124 A1*  9/2004  Ikegame .............. G02B 26/105
                                        359/204.1
(Continued)

FOREIGN PATENT DOCUMENTS

JP    2015-148665    8/2015
JP    2017-083657    5/2017

OTHER PUBLICATIONS

Machine translation of JP 2015-148665A. (Year: 2015).*

*Primary Examiner* — Kimberly N. Kakalec
(74) *Attorney, Agent, or Firm* — Oblon, McClleland, Maier & Neustadt, L.L.P.

(57) ABSTRACT

According to an embodiment, a projection device includes: a light source; an optical scanning unit that includes a base unit, a driver fixed to the base unit, and a reflective unit supported by the driver and that drives the reflective unit to scan light from the light source; and a scanned unit configured to be scanned with the light from the optical scanning unit so that a projection image is formed on the scanned unit. The projection device further includes an attachment unit for attaching the projection device to a setting unit of a setting object on which the projection device is set. The attachment unit attaches the projection device to the setting unit such that a direction in which vibration caused by the setting object is equal to or smaller than a predetermined value and a reflective surface of the reflective unit are approximately perpendicular to each other.

10 Claims, 9 Drawing Sheets

(51) Int. Cl.
*G02B 26/10* (2006.01)
*G03B 21/14* (2006.01)
*G03B 21/10* (2006.01)
*G03B 21/00* (2006.01)
*G03B 21/22* (2006.01)
*G03B 21/28* (2006.01)
*G03B 21/20* (2006.01)
*B60K 35/00* (2006.01)

(52) U.S. Cl.
CPC ....... *G02B 27/0101* (2013.01); *G03B 21/005* (2013.01); *G03B 21/10* (2013.01); *G03B 21/145* (2013.01); *G03B 21/20* (2013.01); *G03B 21/22* (2013.01); *G03B 21/28* (2013.01); *B60K 35/00* (2013.01); *B60K 2370/334* (2019.05); *G02B 2027/0123* (2013.01); *G02B 2027/0154* (2013.01)

(56) References Cited

U.S. PATENT DOCUMENTS

| | | |
|---|---|---|
| 2017/0064264 A1 | 3/2017 | Takahashi |
| 2017/0127033 A1 | 5/2017 | Saito |
| 2018/0239140 A1* | 8/2018 | Uragami .............. H04N 9/3164 |
| 2018/0252916 A1 | 9/2018 | Nakamura et al. |
| 2018/0267306 A1 | 9/2018 | Nakamura et al. |

* cited by examiner

FIG.4
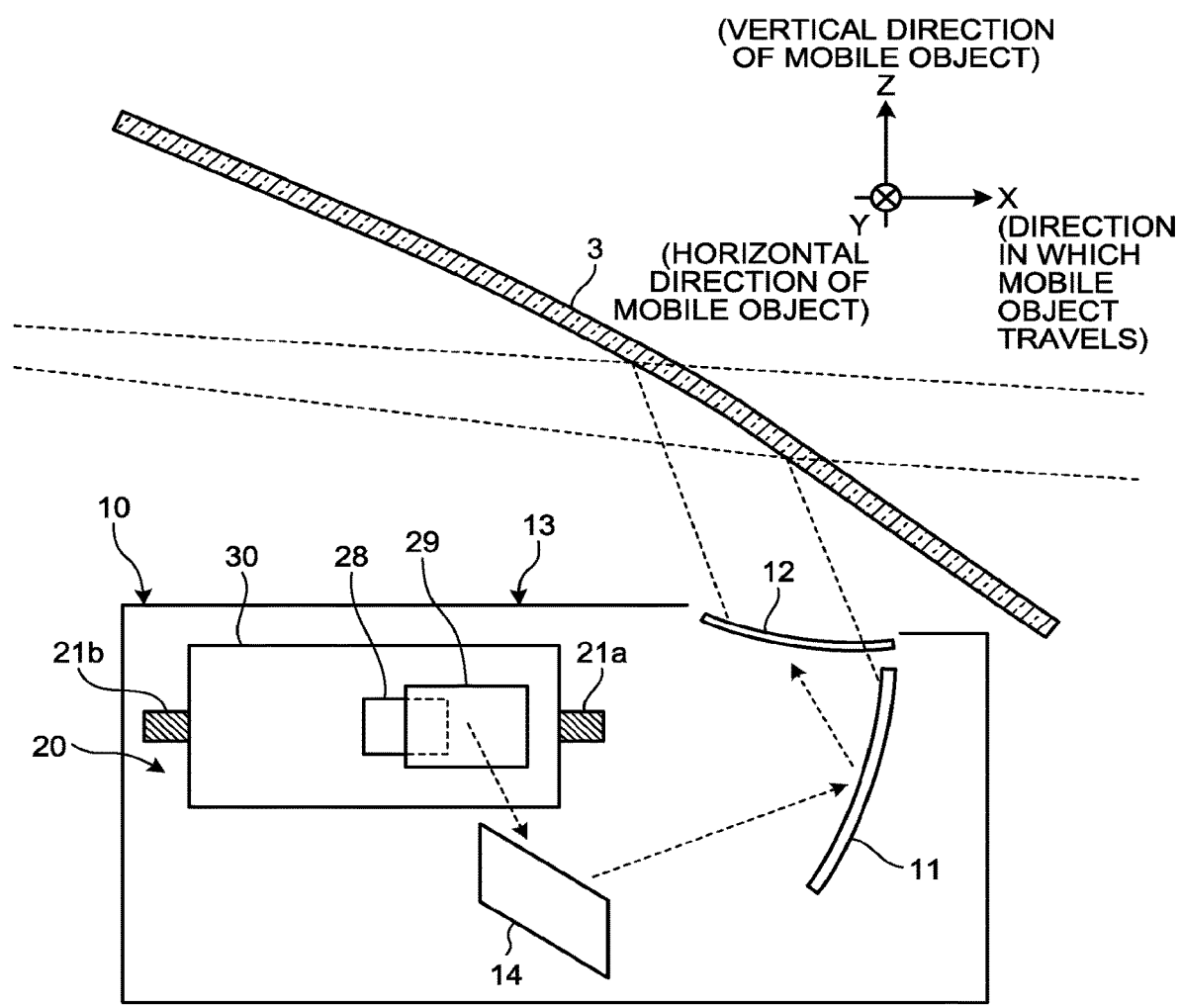
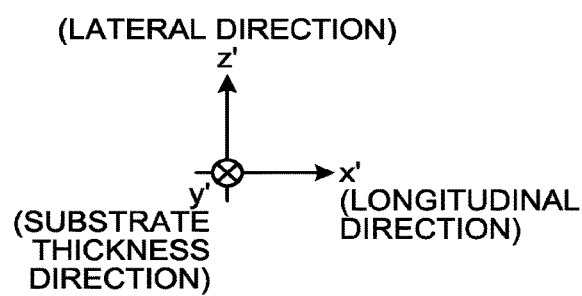

PROJECTION DEVICE, MOBILE OBJECT, AND METHOD OF SETTING PROJECTION DEVICE

CROSS-REFERENCE TO RELATED APPLICATIONS

The present application claims priority under 35 U.S.C. § 119 to Japanese Patent Application No. 2018-044792, filed on Mar. 12, 2018. The contents of which are incorporated herein by reference in their entirety.

BACKGROUND OF THE INVENTION

1. Field of the Invention

The present invention relates to a projection device, a mobile object, and a method of setting a projection device.

2. Description of the Related Art

Today, there are known optical scanning head-up display devices that project a virtual image of a screen image that is generated by scanning light that is emitted from a light source using an optical scanning device to an object on which the virtual image is to be represented such that the virtual image is viewable by a user. The optical scanning device that is provided on the head-up display device has a configuration in which, for example, a mirror unit with a diameter of approximately 1 mm is supported by a spring structure and thus the optical scanning device itself has a resonant frequency at which a high resonance occurs in the optical scanning device.

There is a demand for head-up display devices to have a wider angle of view of a display image area and thus it is necessary to achieve a wider angle of view of optical scanning devices. To increase the angle of view of an optical scanning device, it suffices if rigidity of a spring structure that supports a mirror unit be lowered to allow the mirror unit to rotate widely.

Lowering rigidity of the spring structure that supports the mirror unit however lowers the resonant frequency of the spring structure and thus, for example, in a low frequency band, the spring structure has a natural resonant frequency around few hundred hertz (Hz). When the natural resonant frequency of the low frequency band is excited by external vibration (also simply referred to as "disturbance") occurring in a mobile object, such as a vehicle, the amplitude of the mirror unit becomes unstable, which is a factor in blurred display images. There is a known method in which, in order to solve the problem, an optical unit including an optical scanning device is supported by a damper to damp external vibration that is transmitted to the optical unit.

On the other hand, Japanese Unexamined Patent Application Publication No. 2017-083657 discloses a video projection device capable of maintaining a projection angle range and a spatial position constant by appropriately controlling the mirror unit even when an external environmental factor changes. When forming a video, after a sensor signal corresponding to an angle of deflection of the mirror unit that is a MEMS mirror reaches a predetermined value, the video projection device calculates a product of the time until detection of light by an optical detector and the resonant frequency of the mirror unit. The mirror unit is driven such that the product is kept constant. Accordingly, even when the external environmental factor changes, it is possible to maintain the projection angle range and the spatial position constant.

The damper itself has a high resonant frequency. In order to damp the vibration that is transmitted to the optical unit, it is necessary to design a resonant frequency of the damper within a low frequency band at or lower than a half of the scanning frequency of the optical scanning device. The larger a damping ratio of the damper is designed, the larger the resonance amplification during resonance of the damper is. For this reason, transmission of external vibration around the resonant frequency of the damper increases an amount of displacement (amount of vibration) of the optical unit, which is a factor in a blurry display image.

The external vibration that occurs in the mobile object, such as a vehicle, tends to increase in the low frequency band at or lower than 100 Hz. For this reason, when external vibration of low frequencies occurs in the mobile object, such as a vehicle, the damper greatly resonates and thus increases the amount of displacement of the optical unit, thereby causing inconvenience in that the display image is blurred. In an optical scanning device with a wide angle of view, the spring structure that supports the mirror unit has low rigidity as described above and accordingly external vibration of the low frequency band further increases the amount of displacement of the mirror unit and thus the blur in the display image described above is remarkable.

The technology disclosed in Japanese Unexamined Patent Application Publication No. 2017-083657 can deal with a change in the resonant frequency resulting from an external environmental factor that changes gently with respect to a drive frequency of a micro electro mechanical system (MEMS), such as the temperature or humidity; however, when a change in a frequency that matches the resonant frequency of the MEMS, resulting from, for example, external vibration, occurs, it is difficult to deal with the change and thus a blur occurs in the display image.

In view of the above-described problem, there is a need to provide a projection device, a mobile object, and a method of setting a projection device that reduce vibration that is transmitted from a setting object.

SUMMARY OF THE INVENTION

It is an aim of the present invention to at least partially solve the problems in the conventional technology.

According to an embodiment, a projection device includes: a light source; an optical scanning unit that includes a base unit, a driver fixed to the base unit, and a reflective unit supported by the driver and that drives the reflective unit to scan light from the light source; and a scanned unit configured to be scanned with the light from the optical scanning unit so that a projection image is formed on the scanned unit. The projection device further includes an attachment unit for attaching the projection device to a setting unit of a setting object on which the projection device is set. The attachment unit attaches the projection device to the setting unit such that a direction in which vibration caused by the setting object is equal to or smaller than a predetermined value and a reflective surface of the reflective unit are approximately perpendicular to each other.

BRIEF DESCRIPTION OF THE DRAWINGS

FIG. 4 is a cross-sectional view of the head-up display device taken along the direction in which the mobile object travels;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
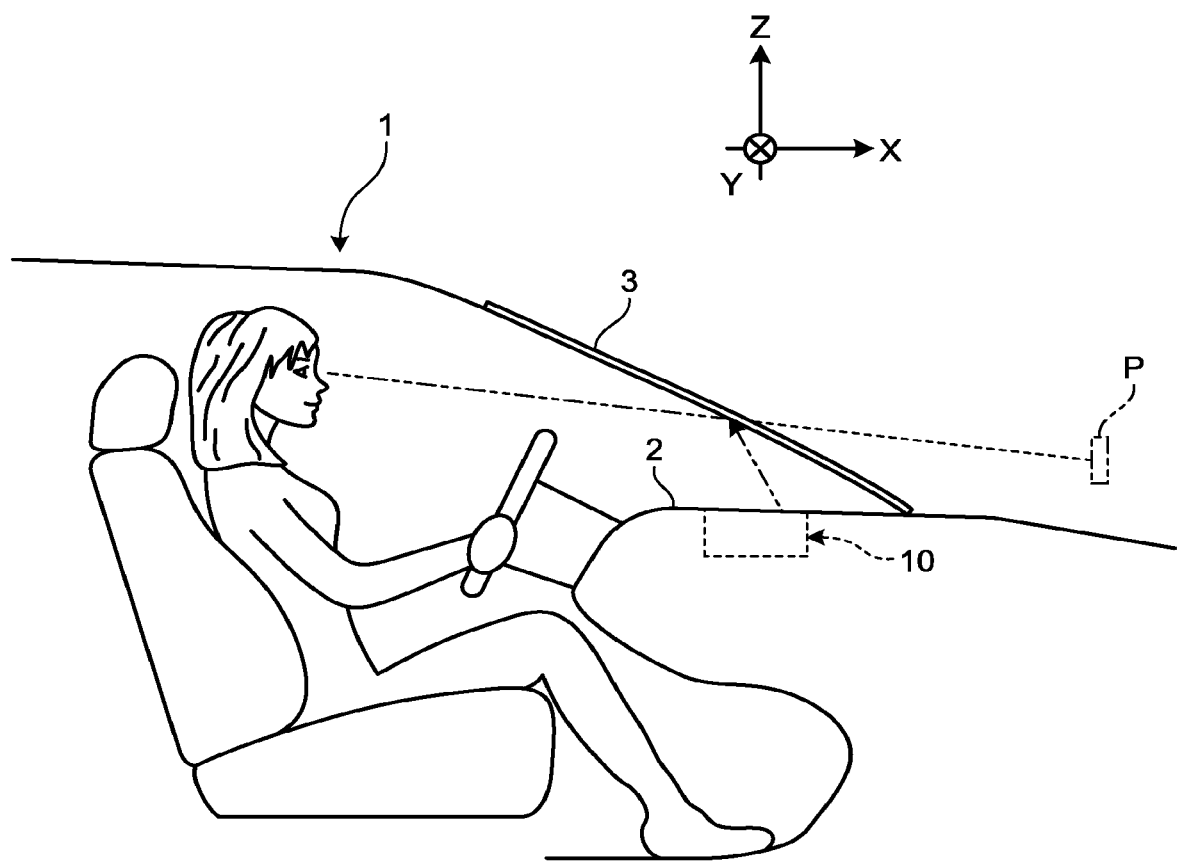
FIG. 1 is a cross-sectional view of a mobile object of an embodiment taken along a direction in which the mobile object travels, illustrating a relevant part.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

A projection device, a mobile object, and a method of setting a projection device will be described below based on a mobile object that will be described as an example.

Configuration of Relevant Part of Mobile Object

FIG. 1 is a cross-sectional view of the mobile object taken long a direction in which the mobile object travels, illustrating a relevant part. As illustrated in FIG. 1, a mobile object 1 is a so-called vehicle in which an instrument panel 2 and a front window glass 3 are provided in front of a driver (operator) who operates a wheel on a driver seat. In the instrument panel 2, a head-up display device 10 is provided as represented by a dotted-line block in FIG. 1. The head-up display device 10 is an exemplary projection device. The mobile object 1 is an exemplary setting object and changes its physical position.

Although this is an example, the head-up display device 10 is a windshield head-up display device that uses part of the front window glass 3 as a projection surface. A display image that is formed by the head-up display device 10 is emitted to the front window glass 3 serving as an object on which the display image is represented and the light of the display image reflected on the front window glass 3 is viewed by the driver. The display image is viewed and recognized by the driver as a virtual image P of the display image in front of the front window glass 3.

Coordinate axes are determined by setting X for the direction in which the vehicle travels, Y for the horizontal direction, and Z for the vertical direction. Instead of the front window glass 3, a combiner that is formed of a small-sized transparent plastic disk, or the like, may be used as a mirror that displays information.

Configuration of Attachment Part

Figure 2:
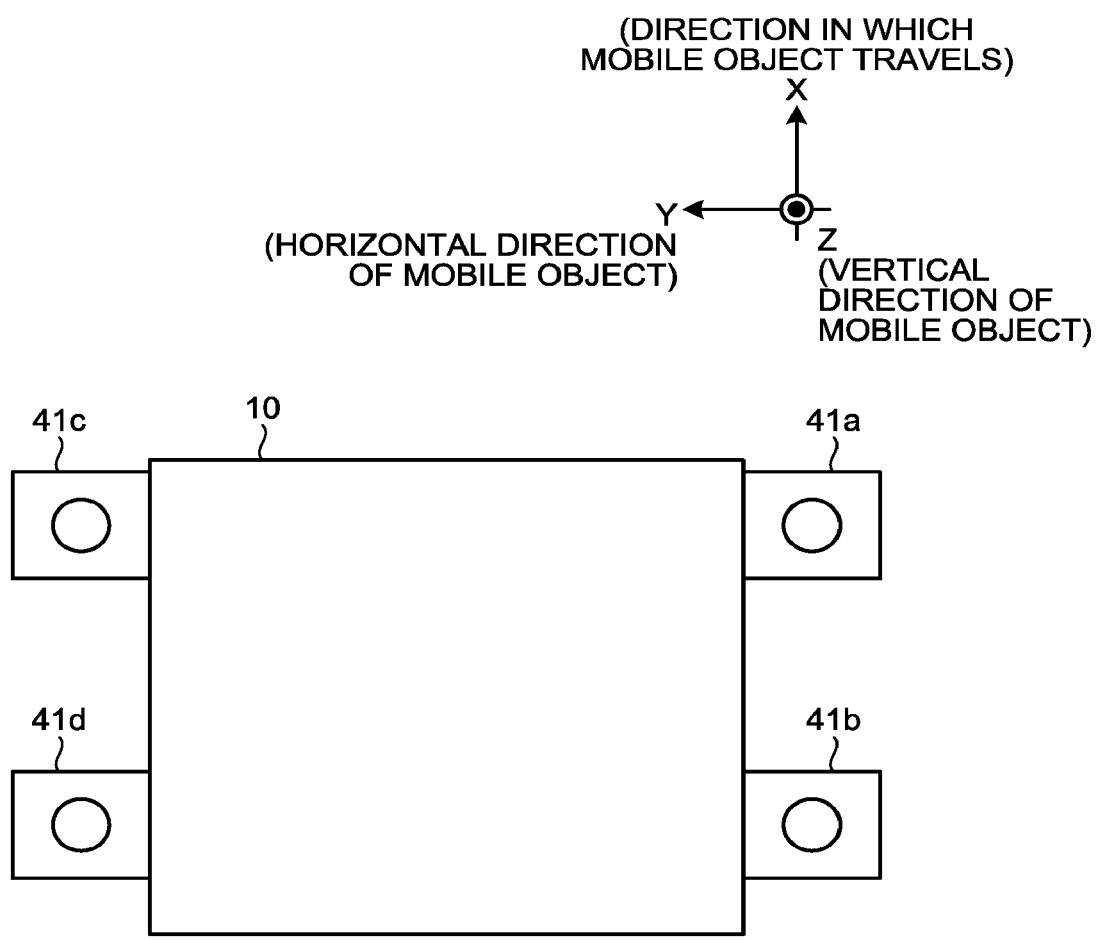
FIG. 2 is a top view of a head-up display device.

FIG. 2 is a top view of the head-up display device 10. As illustrated in FIG. 2, two of attachment parts 41a to 41d for attaching the head-up display device 10 to the mobile object are provided on each of the right surface and the left surface of the head-up display device 10. In the attachment parts, screw holes are provided, respectively. Through the screw holes, the head-up display device 10 is attached to the mobile object 1.

Figure 3:
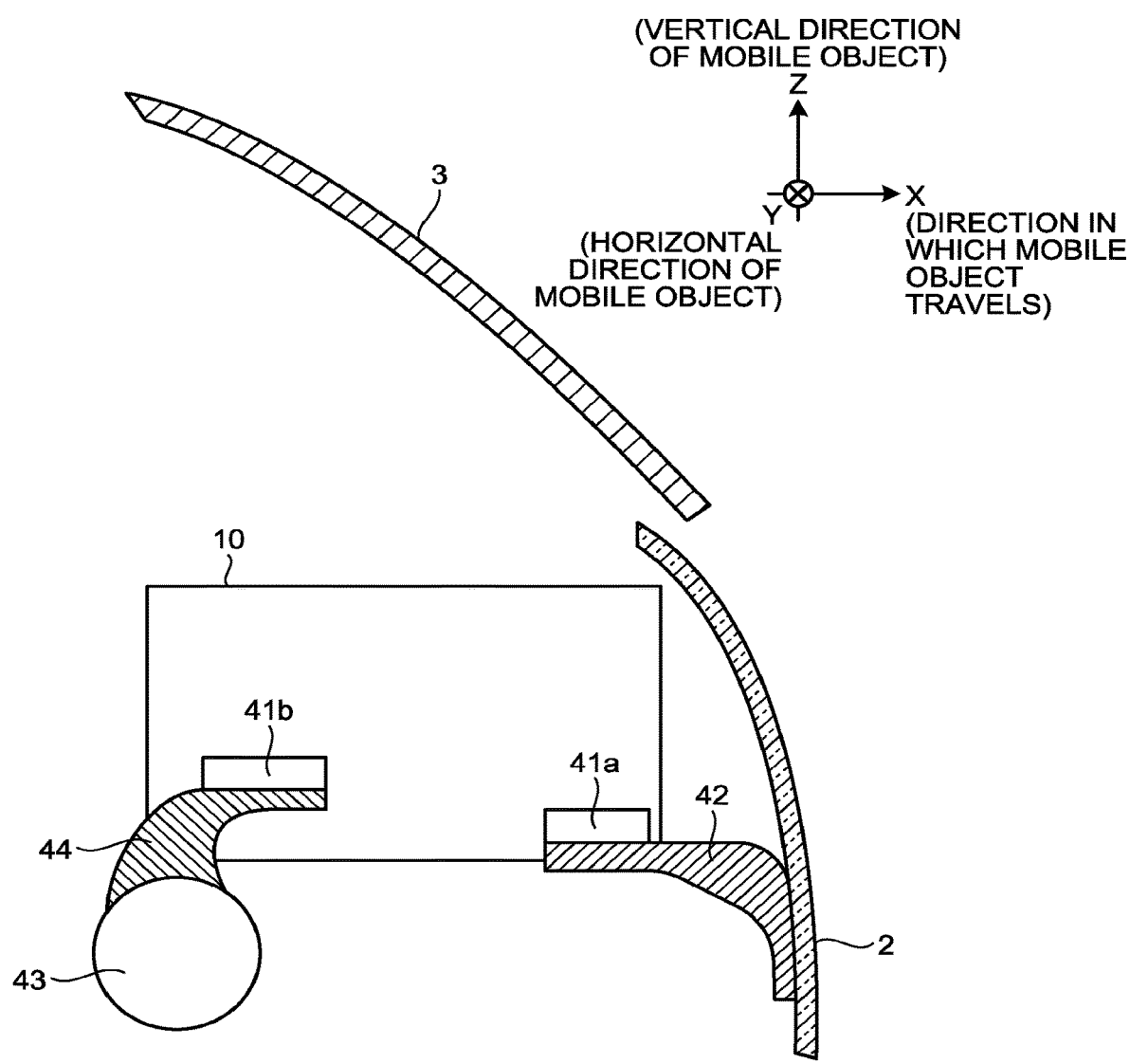
FIG. 3 is a diagram of the head-up display device that is attached to the mobile object.

FIG. 3 is a side view of the head-up display device 10 that is attached to the mobile object 1, viewed from the right side. The mobile object 1 includes an attachment bracket 42 that is welded on or fastened to the instrument panel 2; and an attachment bracket 44 that is welded on or fastened to a cross car beam 43. The attachment bracket 42 and the attachment bracket 44 are an exemplary setting part. The attachment parts 41a and 41c are fastened to the attachment bracket 42 by screws, or the like, and the attachment parts 41b and 41d are fastened to the attachment bracket 44 by screws, or the like, thereby attaching the head-up display device 10 to the mobile object.

Configuration of Head-Up Display Device

FIG. 4 is a cross-sectional view of the head-up display device 10, taken along the direction in which the mobile object 1 travels. As illustrated in FIG. 4, a display image forming device 20 that is an unit (an exemplary light source unit), a reflective mirror 14 that reflects a display image that is generated by the display image forming device 20, and a projection mirror 11 onto which the display image that is reflected on the reflective mirror 14 is projected are housed in a casing 13, thereby forming the head-up display device 10. Furthermore, an ejection window 12 that transmits the display image that is reflected on the projection mirror 11 to project the display image onto the front window glass 3 is provided in the casing 13, thereby forming the head-up display device 10.

The casing 13 is fixed to and supported by an instrument panel structural member (not illustrated in the drawings) inside the instrument panel 2. The optical members that are the reflective mirror 14, the projection mirror 11, and the ejection window 12 in the casing 13 function as an image projection optical system. The optical members that are the reflective mirror 14, the projection mirror 11 and the ejection window 12 match a certain degree of optical design and are arranged with a certain level of arrangement accuracy that does not cause distortion and frame-out in a display image that is projected from the display image forming device 20.

Configuration of Display Image Forming Device

Figure 5:
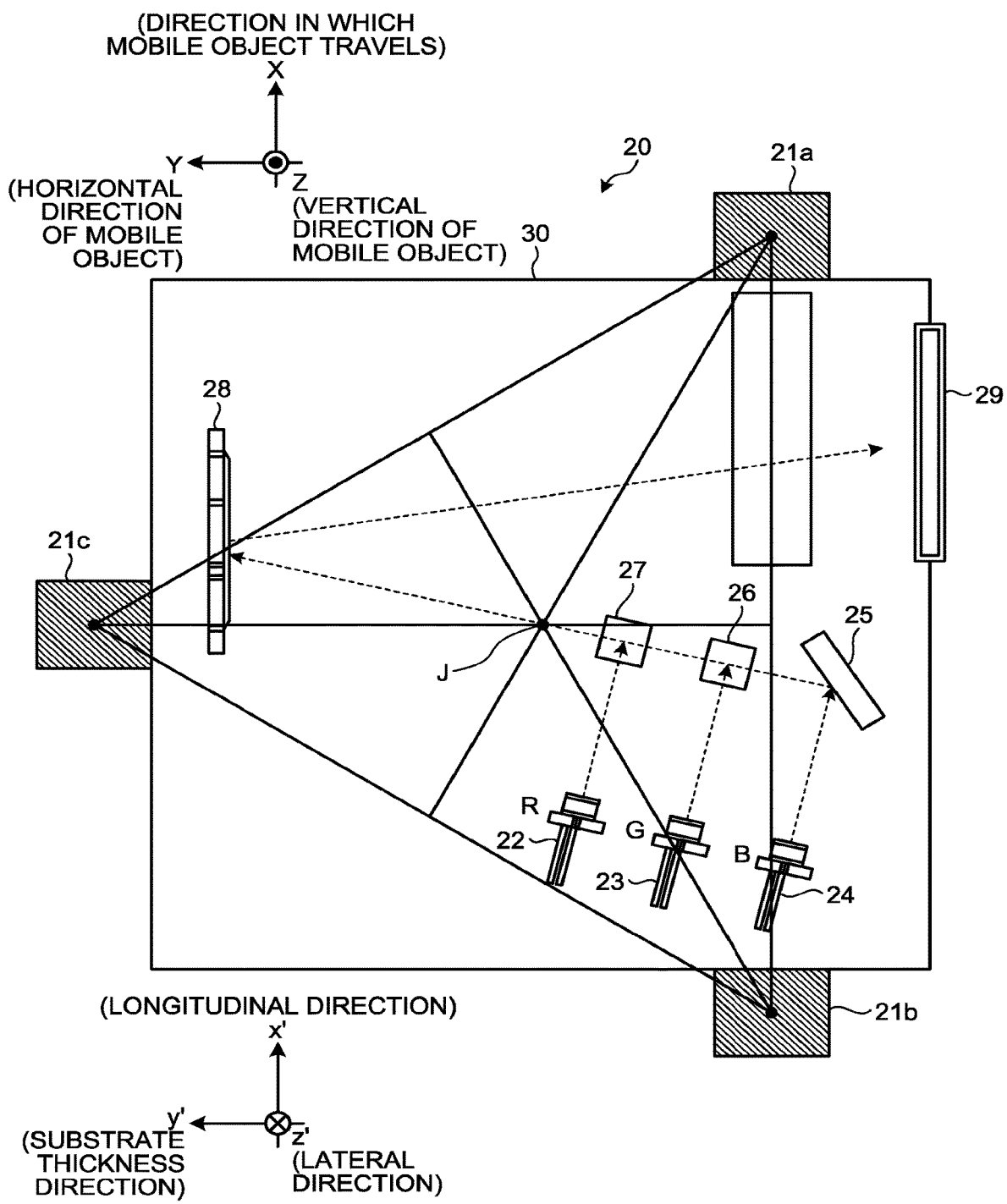
FIG. 5 is a diagram of an internal configuration of a display image forming device.

FIG. 5 illustrates an internal configuration of the display image forming device 20. A casing 30 of the display image forming device 20 is fixed to the casing 13 of the head-up display device 10 via anti-vibration members 21a to 21c. Although this is an example, in the mobile object 1 of the embodiment, any one of the anti-vibration members 21a to 21c is arranged on any one of three spots such that an approximately triangular shape is formed when the three anti-vibration members 21a to 21c are connected by lines. The casing 30 of the display image forming device 20 is fixed to the casing 13 of the head-up display device 10 such that the center of gravity of the casing 30 matches the center of gravity J of a triangle that is formed by the three anti-vibration members 21a to 21c on a X-Y plane, a Y-Z plane, and a Z-X plane.

Fixing the display image forming device 20 to the casing 13 such that the center of gravity of each of the planes of the display image forming device 20 and the center of gravity J of the triangle that is formed by the three anti-vibration members 21a to 21c match makes it possible to inhibit inertia moment from being applied to the casing 30, inhibit the casing 30 from vibrating and hold the casing 30 stably.

The display image forming device 20 includes laser light sources 22, 23 and 24, a blue reflective mirror 25, a green reflective dichroic prism 26, a red reflective dichroic prism 27, an optical scanning device 28, and a screen 29. The laser light sources 22 to 24 of the respective colors are an exemplary light source. The optical scanning device 28 is an exemplary optical scanning device. The screen 29 is an exemplary unit to be scanned.

Blue laser light that is emitted from the blue laser light source 24 is totally reflected on the blue reflective mirror 25 and is emitted through the green reflective dichroic prism 26 and the red reflective dichroic prism 27 sequentially to the optical scanning device 28. Green laser light that is emitted from the green laser light source 23 is reflected by the green reflective dichroic prism 26 and is emitted to the optical scanning device 28 via the red reflective dichroic prism 27. Red laser light that is emitted from the red laser light source 22 is reflected on the red reflective dichroic prism 27 and is emitted to the optical scanning device 28.

Figure 10:
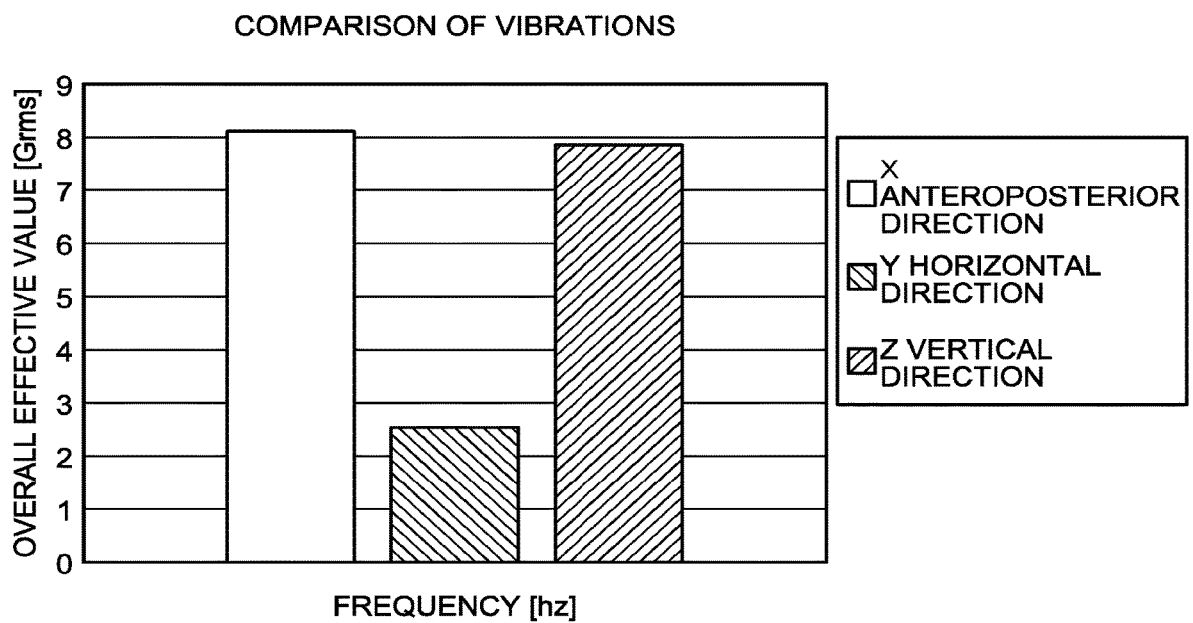
FIG. 10 is a graph of an exemplary overall effective values of attachment parts of the head-up display device of the mobile object in X, Y and Z directions.

In short, the laser lights of the respective colors are synthesized by the red reflective dichroic prism 27 and then emitted to the optical scanning device 28. The above-described synthesized light that is incident on the optical scanning device 28 is scanned using two axes by the optical scanning device 28 to be scanning light (exemplary projection image) and the scanning light is emitted to the screen 29. The screen 29 is formed of a diffuser panel, a micro lens, etc. The screen 29 forms an intermediate image corresponding to the scanning light and emits the intermediate image. The intermediate image is emitted to the reflective mirror 14, the projection mirror 11, the ejection window 12, and the front window glass 3 that are illustrated in FIG. 4. The driver views the virtual image P that is the display image as illustrated in FIG. 10.

Configuration of Optical Scanning Device

Figure 6:
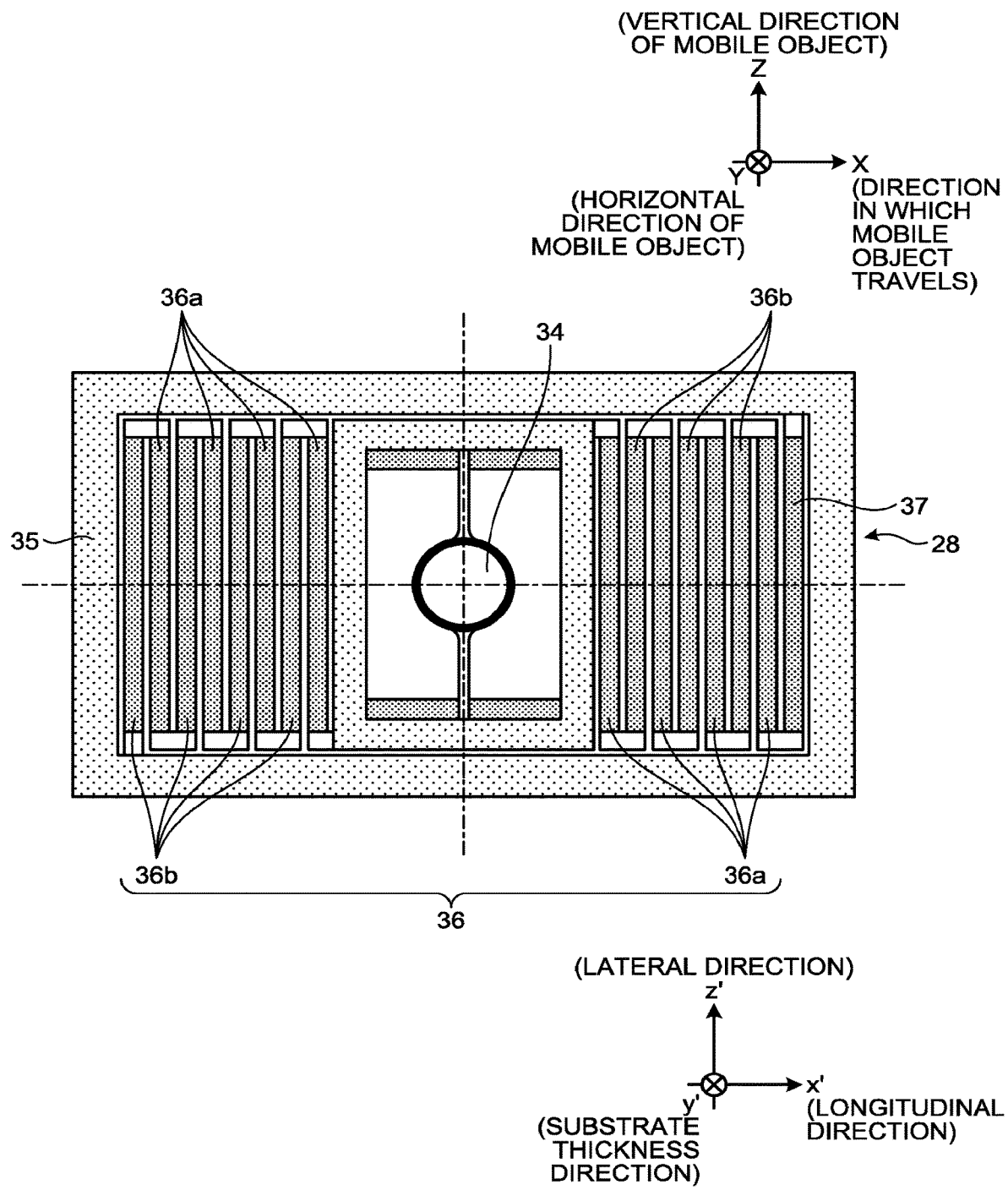
FIG. 6 is front view of an optical scanning device.

Although this is an example, a micro electro mechanical system (MEMS) mirror is provided in the optical scanning device 28. A metal coil is formed on single-crystal silicone, a mirror is formed inside the coil by MEMS processing, and a magnet is arranged under a substrate, thereby forming the MEMS mirror. As illustrated in FIG. 6, the optical scanning device 28 in which such a MEMS mirror is provided includes a movable mirror unit 34 and a frame member 35. The movable mirror unit 34 is an exemplary reflective unit. The frame member 35 is an exemplary base unit. FIG. 6 illustrates the frame member 35 that has a hollow frame shape. Alternatively, the frame member 35 may have a U-shape.

In FIG. 6 (FIG. 4 and FIG. 5), the x'-y'-z' coordinate system is a coordinate system of the optical scanning device 28 and the X-Y-Z coordinate system is a coordinate system of the mobile object 1. The x' direction represents the longitudinal direction of the optical scanning device 28 that has an oblong rectangular shape, the y' direction represents the direction of the thickness of the substrate of the optical scanning device 28, and the z' direction represents the lateral direction of the optical scanning device 28. The X direction represents the direction in which the mobile object travels, the Y direction represents the horizontal direction of the mobile object, and the Z direction represents the vertical direction of the mobile object.

The frame member 35 has multiple folded areas that support a tortuous beam pair 36 that is formed tortuously. The tortuous beam pair 36 is an exemplary driver and is divided into alternate beams 36a and beams 36b. In the tortuous beam pair 36, piezoelectric members (piezoelectric layers) 37 that are independent of each other are respectively provided on the beam 36a and the beam 37b that are adjacent to each other.

Different voltages are applied alternately to the piezoelectric members 37 (to the beams 36a and the beams 36b). Thus, flexures in different directions occurs in the adjacent beams 36a and 36b. This enables the movable mirror unit 34 to rotate about the Z-axis (vertical direction) at an angle corresponding to each of the accumulated flexures of the beams 36a and the beams 36b. On the other hand, optical scanning in the horizontal direction based on the X-axis is performed by resonance using a torsion bar that is connected to the optical scanning device 28.

In order to deflect a beam with such a MEMS mirror fast, it is necessary to drive the movable mirror unit 34 near a resonance point. For this reason, the angle of deflection, that is, the angle of inclination of the movable mirror unit 34 is changed sinusoidally with respect to the time. The movable mirror unit 34 has a small diameter of approximately 1 mm and has a small rotational moment, which makes it possible to increase the resonant frequency in the direction of torsion (direction of rotation) and obtain a large amplitude easily.

Resonant Frequency Characteristics of Anti-Vibration Member

Figure 7:
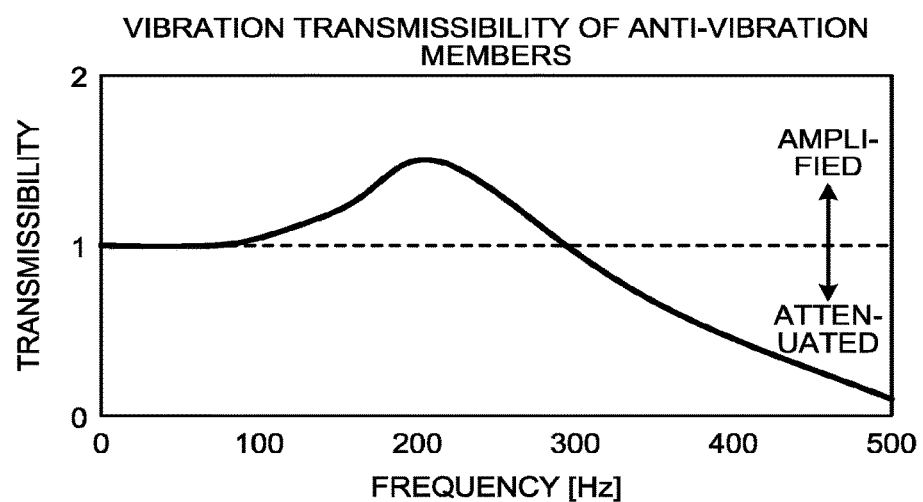
FIG. 7 is a diagram of vibration transmission characteristics of anti-vibration members.

The anti-vibration members 21a to 21c are formed of, for example, silicon rubber or butyl rubber. FIG. 7 represents vibration transmission characteristics of the anti-vibration members 21a to 21c. The horizontal axis in FIG. 7 represents frequency (Hz) and the vertical axis represents transmissibility. The mobile object 1 of the embodiment is designed such that the resonant frequency of the anti-vibration members 21a to 21c that are determined by the mass of the display image forming device 20 and the rigidity of the anti-vibration members 21a to 21c is within a range at or above 100 Hz. Near the resonant frequency, the transmissibility is larger than "1" represented by the dotted line in FIG. 7. This means that transmission of inputted vibration to the anti-vibration members 21a to 21c amplifies the vibration. On the other hand, in a frequency band approximately equal to or higher than a product of the resonant frequency and the square root of 2, the transmissibility is smaller than "1". This means that vibration of a frequency approximately equal to or higher than a product of the resonant frequency and the square root of 2 is damped by the anti-vibration members 21a to 21c.

Vibrational Characteristics of Mobile Object

Figure 8:
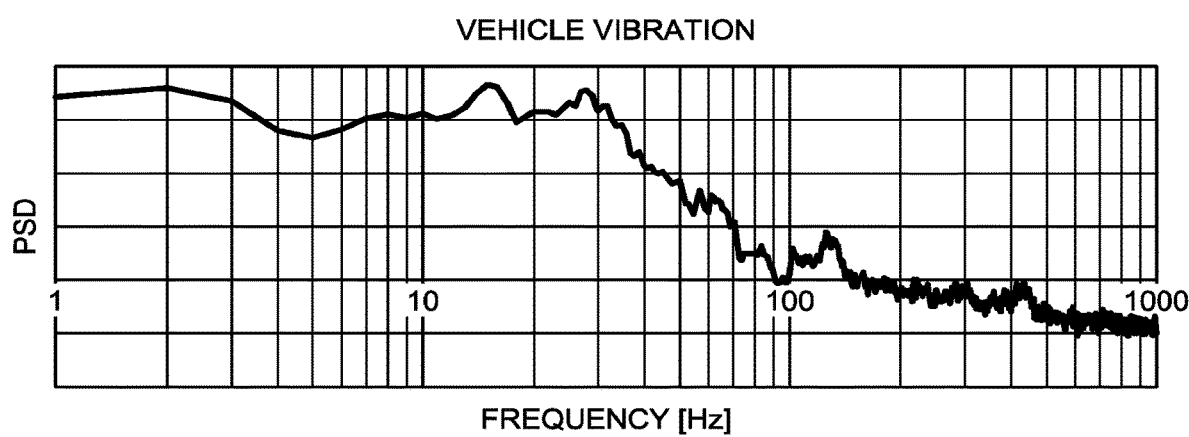
FIG. 8 is a diagram of vibrational characteristics of the mobile object.

FIG. 8 represents vibrational characteristics of the mobile object 1. The horizontal axis of FIG. 8 represents frequency (Hz) and the vertical axis represents acceleration power spectral density (PSD). As illustrated in FIG. 8, in general, disturbance vibration that is transmitted from the mobile object 1 to the head-up display device 10 increases up to 100 Hz. For this reason, in the mobile object 1 of the embodiment, the resonant frequency of the anti-vibration members 21a to 21c is set at or above 100 Hz. Accordingly, even when the anti-vibration members 21a to 21c resonate, it is possible to prevent inconvenience in that the disturbance increases the vibration amplitude and maintain high positional accuracy between the display image forming device 20 and the latter optical elements (the reflective mirror 14, the projection mirror 11, the ejection window 12, and the front window glass 3).

Characteristics of Response of Optical Scanning Device to Vibration

Figure 9:
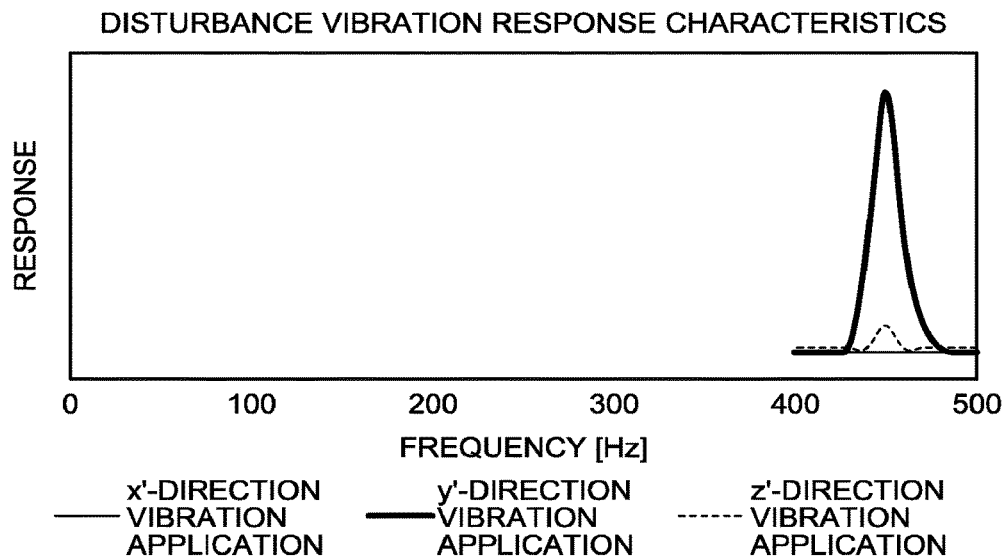
FIG. 9 is a diagram of vibration response characteristics around a primary resonance point of the optical scanning device.

FIG. 9 represents vibration response characteristics of the optical scanning device 28 near a primary resonance point. The horizontal axis of FIG. 9 represents frequency (Hz) and the vertical axis of FIG. 9 represents response level. As described above, the optical scanning device 28 is supported by a spring structure as described above and thus has a steep response peak as represented by the solid line in FIG. 9. The primary resonance is excited by disturbance vibration in the "y' direction" that is the direction of the thickness of the substrate of the optical scanning device 28 illustrated in FIG. 6. In other words, when disturbance vibration is applied in the direction of the thickness of the substrate, the optical scanning device 28 resonates and two-dimensional scanning is disturbed and thus a blur occurs in the display image. This is because, in the "y' direction" of the optical scanning device 28, the rigidity is low and thus the resonant frequency lowers and the amount of displacement increases.

Frequency Distribution of Disturbance Vibration

On the other hand, disturbance vibration that is transmitted from the mobile object 1 to the head-up display device 10 is the smallest in the horizontal direction (the Y direction in FIGS. 5 and 6) of the mobile object 1. FIG. 10 illustrates exemplary overall effective values of the attachment parts of the head-up display device 10 on the mobile object 1 in the X, Y and Z directions. In FIG. 10, the horizontal axis represents frequency (Hz) and the vertical axis represents overall effective value. An overall effective value is a value representing a magnitude of acceleration of a whole frequency range. The white bar represents an overall effective value of vibration in the anteroposterior direction (X direction) of the mobile object 1, a bar with rightward slashes represents an overall effective value of vibration in the horizontal direction (Y direction) of the mobile object 1, and a bar with leftward slashes represents an overall effective value of vibration in the vertical direction (the gravitational direction: Z direction) of the mobile object 1.

As it is understood from FIG. 10, the overall effective value of vibration of the mobile object 1 is smaller in the Y direction (horizontal direction) than in the X direction (anteroposterior direction) and the Z direction (the center-of-gravity direction). This is because, while the X direction and the Y direction of the mobile object 1 are directions in which the mobile object 1 is susceptible to effects of unevenness of the road surface or variation in the vehicle speed, the Y direction is a direction that are not susceptible to these effects.

Mode of Setting Display Image Forming Device

Under such circumstances, the head-up display device 10 is attached to the mobile object 1 of the embodiment by fastening the attachment parts 41a to 41d with screws to the attachment bracket 42 and the attachment bracket 44 such that the horizontal direction (Y direction) in which vibration that is caused by the mobile object 1 is at or under a predetermined value and the reflective surface of the movable mirror unit 34 of the optical scanning device 28 are approximately perpendicular to each other. The optical scanning device 28 is provided in the head-up display device 10 such that the direction in which the optical scanning device 28 is the most susceptible to disturbance vibration from the mobile object 1 and the direction in which vibration that occurs in the mobile object 1 is the smallest, among the directions corresponding to the shape of the substrate of the optical scanning device 28, match.

In other words, although this is an example, specifically, as illustrated in FIGS. 4 to 6, in the mobile object 1 of the embodiment, the display image forming device 20 is provided on the mobile object 1 such that the direction of the thickness (y' direction) of the substrate of the optical scanning device 28 in which the optical scanning device 28 is susceptible to the disturbance vibration and the horizontal direction (Y direction) that is a direction of the mobile object 1 in which the disturbance vibration reduces match each other. The horizontal direction (Y direction) of the mobile object 1 is an exemplary lateral direction that is parallel to the ground.

In other words, as illustrated in FIG. 5, the optical scanning device 28 is provided in the casing 30 of the display image forming device 20 such that the straight line in the longitudinal direction and the straight line connecting the anti-vibration member 21a and the anti-vibration member 21b are parallel to each other. Furthermore, as illustrated in FIG. 4, the casing 30 is provided, being fixed to the mobile object 1 such that the straight line connecting the anti-vibration member 21a and the anti-vibration member 21b match the direction in which the mobile object 1 travels (X direction). Fixing the casing 30 of the display image forming device 20 to the mobile object 1 as described above makes it possible to, as illustrated in FIG. 4, fix the display image forming device 20 to the mobile object 1 with the direction of the thickness of the substrate of the optical scanning device 28 (y' direction) and the horizontal direction (Y direction) of the mobile object 1 matching each other.

Accordingly, it is possible to match the horizontal direction (Y direction) of the mobile object in which vibration is small and the direction of the thickness of the substrate in which the optical scanning device 28 is susceptible to disturbance vibration (y' direction) and reduce the disturbance vibration that is transmitted from the mobile object 1 to the optical scanning device 28. Accordingly, it is possible to provide the head-up display device 10 enabling preferable display images without blur in image due to resonance of the optical scanning device 28.

Designing the anti-vibration members 21a to 21c with vibration damping characteristics that attenuate primary resonant frequency components (low-frequency component) of the optical scanning device 28 makes it possible to further inhibit disturbance vibration from being transmitted from the mobile object 1 to the optical scanning device 28.

Lowering rigidity of the spring structure that supports the movable mirror unit 34 illustrated in FIG. 6 makes it possible to widely rotate the movable mirror unit 34 and increase the angle of view of the optical scanning device 28. When rigidity of the spring structure that supports the movable mirror unit 34 is reduced, the resonant frequency of the spring structure accordingly lowers and the optical scanning device 28 has natural resonant frequency components (low frequency components), for example, near few hundred Hz in a lower frequency band.

In the mobile object 1 of the embodiment, however, it is possible to inhibit transmission of vibration of the low frequency band to the optical scanning device 28 as described above. For this reason, even when lowering rigidity of the spring structure that supports the movable mirror unit 34 of the optical scanning device 28 enables the movable mirror unit 34 to have a natural resonant frequency of a low-frequency band, it is possible to prevent inconvenience in that the optical scanning device 28 resonates in the low frequency band. It is also possible to increase the angle of view by lowering rigidity of the spring structure that supports the movable mirror unit 34 without obstacle. Accordingly, it is possible to provide the head-up display device 10 with a wide angle of view and without image blur.

Figure 11:
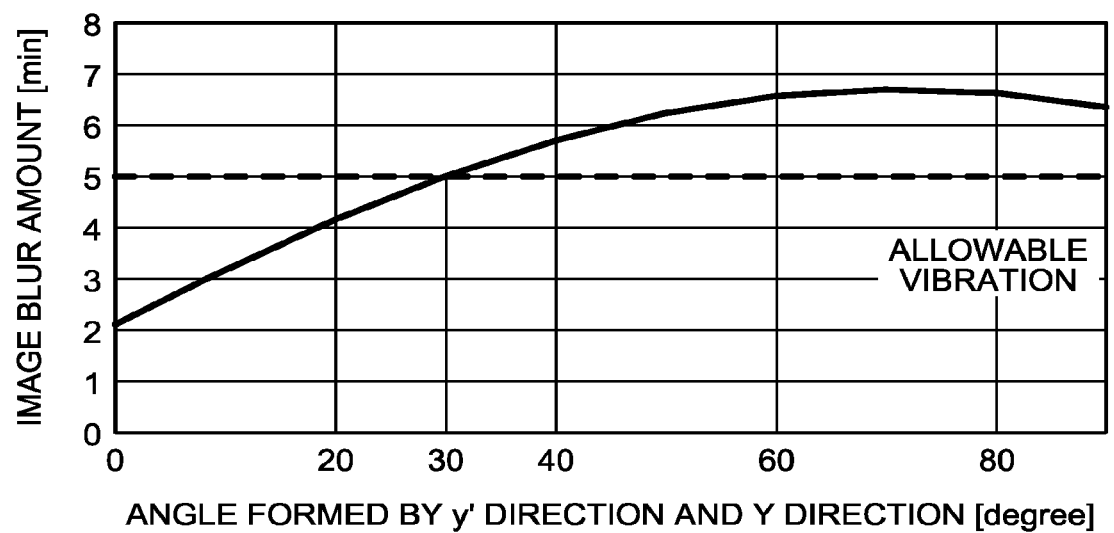
FIG. 11 is a graph of a result of evaluating changes in angle of a display image on the head-up display device obtained when a "y' direction" that is a direction of the thickness of a substrate of the optical scanning device is shifted gradually from a "Y direction" that is the horizontal direction of the mobile object.

FIG. 11 represents a result of evaluating changes in angle of a display image of the head-up display device 10 that are obtained when the "y' direction" that is the direction of the thickness of the substrate of the optical scanning device 28 is gradually shifted from the "Y direction" that is the horizontal direction of the mobile object 1. In FIG. 11, the horizontal axis represents angle that is formed by the "y' direction" of the optical scanning device 28 and the "Y direction" of the mobile object 1 and the vertical axis represents amount of image blur (min=1/60 degrees).

When the angle that is formed by the straight line in the "y' direction" that is the direction of the thickness of the substrate of the optical scanning device 28 and the straight line in the "Y direction" that is the horizontal direction of the mobile object 1 is changed gradually, the projection components in the X, Y and Z directions of the mobile object 1 with respect to the "y' direction" change and, as represented by the solid line in FIG. 11, the angle of the display image of the head-up display device 10 changes.

While the mobile object 1 is traveling, in general, the driver (operator) is able to recognize a change of about 5 min in the angle of display of a subject. For this reason, in order to prevent blur in the display image of the head-up display device 10, it is necessary to keep the image vibration angle at 5 mn or smaller, i.e., within an allowable amplitude range that is represented by the dotted line in FIG. 11.

For this reason, in the mobile object 1 of the embodiment, the head-up display device 10 is attached to the mobile object 1 such that the angle that is formed by the straight line in a direction approximately orthogonal to the reflective surface of the movable mirror unit 34 of the optical scanning device 28 and the straight line in the "'y direction" in which vibration caused by the mobile object 1 is at or under the predetermined value is an angle within the allowable amplitude range that disables the operator to recognize a swing that is caused in the projected image due to vibration caused by the mobile object 1.

In other words, as illustrated in FIG. 11, the optical scanning device 28 is arranged such that the angle that is formed by the straight line in the "y' direction" that is the direction of the thickness of the substrate of the optical scanning device 28 and the straight line in the "Y direction" that is the horizontal direction of the mobile object 1 is 30 degrees or smaller.

Accordingly, it is possible to, even when a blur (swing) in the display image occurs in the head-up display device 10, keep the blur at a level where the blue is unrecognizable by the driver (operator).

Effects of Embodiment

As it is clear from the descriptions above, in the mobile object 1 of the embodiment, the display image forming device 20 is fixed to the mobile object 1 with the direction (y' direction) of the thickness of the substrate of the optical scanning device 28 and the horizontal direction (Y direction) of the mobile object 1 matching each other. Accordingly, it is possible to provide the head-up display device 10 that prevents inconvenience in that low-frequency vibration is transmitted from the mobile object 1 to the optical scanning device 28, thereby enabling a preferable display image without image blur.

Prevention of transmission of low-frequency vibration to the optical scanning device 28 is enabled and thus, even when rigidity of the spring structure that supports the movable mirror unit 34 of the optical scanning device 28 is lowered and accordingly the movable mirror unit 34 has a natural resonant frequency of a low frequency band, it is possible to prevent inconvenience in that the optical scanning device 28 resonates in the low frequency band. Accordingly, it is possible to provide the head-up display device 10 with a large angle of view.

The display image forming device 20 is fixed to the mobile object 1 via the anti-vibration members 21a to 21c that have resonance characteristics with respect to frequencies equal to or higher than the resonant frequency in the horizontal direction (Y direction) of the mobile object 1 and that damp vibration of frequencies under the resonant frequency in the horizontal direction (Y direction) of the mobile object 1.

Accordingly, it is possible to provide the head-up display device 10 that enables significant reduction of vibration that is transmitted from the mobile object 1 to the head-up display device 10 and a wider angle of view without image blur.

Each of the above-described embodiments is represented as an example and is not intended to limit the scope of the invention. For example, according to the descriptions of the above-described embodiment, the three anti-vibration members 21a to 21c are used. Alternatively, four or five anti-vibration members may be used. A fluid damper may be used as the anti-vibration members 21a to 21c or the anti-vibration members 21a to 21c having a grommet shape may be used. Any of the cases enables the same effect as that described above.

A light emitting diode (LED) may be used as each of the laser light sources 22 to 24 and an optical scanning device including the movable mirror units 34 may be used as the optical scanning device 28. This case also enables the same effect as that described above.

According to the descriptions of the above-described embodiment, the mobile object 1 is a vehicle.

Alternatively, the mobile object 1 may be another mobile object, such as an airplane or a ship. The above-described embodiment is an example in which the present invention is applied to a head-up display device. Alternatively, the present invention may be applied to a so-called projector device. Any of the cases enables the same effect as that described above.

The embodiment produces an effect that it is possible to reduce vibration that is transmitted from the setting object to the projection device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

What is claimed is:

1. A projection device, comprising:
   a light source;
   an optical scanning device that includes a base, a driver fixed to the base and a reflector supported by the driver, and that drives the reflector to scan light from the light source; and
   a screen configured to be scanned with the light from the optical scanning device so that a projection image is formed on the screen,
   wherein the projection device further comprises at least one attachment part to attach the projection device to a setting object on which the projection device is set, and
   the at least one attachment part attaches the projection device to the setting object such that a particular direction, among three orthogonal directions, in which vibration caused by the setting object is smallest, and (2) a reflective surface of the reflector, are approximately perpendicular to each other.

2. The projection device according to claim 1, wherein
   the particular direction approximately perpendicular to the reflective surface of the reflector is a direction in which the optical scanning device is susceptible to vibration that is caused by the setting object, and
   a lateral direction of the setting object that is parallel to the ground is the particular direction in which the vibration caused by the setting object is the smallest, and
   the at least one attachment part attaches the projection device to the setting object such that the particular direction that is approximately perpendicular to the reflective surface of the reflector matches the lateral direction of the setting object.

3. The projection device according to claim 1, wherein a light source device including the light source and the optical scanning device is attached to a housing of the projection device via at least one anti-vibration member that has vibration damping characteristics that attenuate primary resonant frequency components of the projection device.

4. The projection device according to claim 3, wherein the light source device is attached to the housing via three anti-vibration members forming a triangle, and
   the light source device is attached to a casing of the projection device via the three anti-vibration members such that a center of gravity of the light source device matches a center of gravity of the triangle on an X-Y plane, a Y-Z plane, and a Z-X plane.

5. The projection device according to claim 1, wherein the at least one attachment part attaches the projection device to the setting object such that an angle that is formed by a first straight line in a direction approximately perpendicular to the reflective surface of the reflector and a second straight line in the particular direction in which the vibration caused by the setting object is the smallest is within an allowable amplitude range so that an operator does not recognize a swing caused in the projection image due to the vibration caused by the setting object.

6. The projection device of claim 1, wherein the at least one attachment part attaches the projection device to the setting object so that the reflective surface of the reflector is aligned substantially in a plane including a direction in which the setting object travels and a vertical direction of the setting object.

7. The projection device of claim 1, wherein a light source device, including the light source and the optical scanning device, is attached to a housing of the projection device independently of the projection device being attached to the setting object.

8. A mobile object that changes its physical position, the mobile object comprising the projection device according to claim 1.

9. A method of setting a projection device including a light source; an optical scanning device that includes a base, a driver fixed to the base, and a reflector supported by the driver, and that drives the reflector to scan light from the light source; and a screen that is scanned with the light from the optical scanning device so that a projection image is formed on the screen, the method comprising:
   by at least one attachment part to attach the projection device to a setting object on which the projection device is set, attaching the projection device to the setting object such that (1) a particular direction, among three orthogonal directions, in which vibration caused by the setting object is smallest and (2) a reflective surface of the reflector, are approximately perpendicular to each other.

10. A mobile object, comprising:
    a setting bracket to which a projection device is attached, the projection device including: a light source; an optical scanning device that includes a base, a driver fixed to the base, and a reflector supported by the driver, and that drives the reflector to scan light from the light source; and a unit screen that is scanned with the light from the optical scanning unit so that a projection image is formed on the screen,
    wherein the projection device is attached such that (1) a particular direction, among three orthogonal directions in which vibration caused by the mobile object is smallest, and (2) a reflective surface of the reflector, are approximately perpendicular to each other.

\* \* \* \* \*